US005578370A

United States Patent [19]

Ferrar et al.

[11] Patent Number: 5,578,370
[45] Date of Patent: Nov. 26, 1996

[54] MOLECULARLY INTERSPERSED THERMOPLASTIC COMPOSITE MAT

[75] Inventors: Andrew N. Ferrar; David D. Phin, both of Dundee, Scotland

[73] Assignee: Don & Low (Holdings) Limited, Angus, Scotland

[21] Appl. No.: 312,684

[22] Filed: Sep. 27, 1994

Related U.S. Application Data

[63] Continuation of Ser. No. 915,705, filed as PCT/GB91/00132 filed Jan. 30, 1991 published as WO91/11324 filed Aug. 8, 1991, abandoned.

[30] Foreign Application Priority Data

Feb. 2, 1990 [GB] United Kingdom .................... 9002374

[51] Int. Cl.$^6$ ............................... D02G 3/00; D04H 1/04; D04H 3/08; B29D 31/00
[52] U.S. Cl. ........................ 428/288; 428/221; 428/296; 428/311.1; 428/373; 428/374; 428/378; 428/394; 428/395; 428/397; 156/180; 264/147
[58] Field of Search ............................. 428/95, 373, 221, 428/288, 296, 311.1, 374, 378, 394, 395, 397; 156/180; 264/147

[56] References Cited

U.S. PATENT DOCUMENTS

| 2,772,994 | 12/1956 | Lacy | 428/203 |
|---|---|---|---|
| 3,397,101 | 8/1968 | Rausing | 156/229 |
| 3,400,190 | 9/1968 | Donald | 264/171 |
| 3,533,893 | 10/1970 | Hartstein | 428/95 |
| 3,627,605 | 12/1971 | Taylor . | |
| 4,294,876 | 10/1981 | Camden et al. . | |
| 5,071,705 | 12/1991 | Tanaka et al. | 428/370 |

FOREIGN PATENT DOCUMENTS

| 133448 | 1/1979 | Germany . | |
|---|---|---|---|
| 8046144 | 3/1983 | Japan . | |
| 89/12707 | 12/1989 | Japan | 428/229 |
| 1420517 | 1/1976 | United Kingdom . | |

OTHER PUBLICATIONS

"Net like Fabric", a translation of WO 89/12707 to Yabuki. Application Number Derwent Accession No. 88-151 629 (WPIL) & JP, A, 63/92 750 (DIATEX K.K.) Date Apr. 23, 1988 Country Japan.

*Primary Examiner*—Terrel Morris
*Attorney, Agent, or Firm*—Pennie & Edmonds

[57] ABSTRACT

A thermoplastic composite material comprising a molecularly-oriented thermoplastic polymer base having at least one thermoplastic surface polymeric layer. This surface polymeric layer is compatibly bonded to the polymer base by molecular interspersion between the contiguous surfaces of the adjoining base and surface layer. The surface polymeric layer also has a softening temperature lower than that of the polymer base.

32 Claims, No Drawings

MOLECULARLY INTERSPERSED THERMOPLASTIC COMPOSITE MAT

This is a continuation of application Ser. No. 07/915,705, filed as PCT/GB91/00132 filed Jan. 30, 1991 published as WO91/11324 filed Aug. 8, 1991, now abandoned.

This invention relates to a thermoplastic composite material and a method of its production. The composite material is suitable for a variety of applications requiring mechanical strength in the direction of the plane of the fabric as well as in a direction normal thereto. Such applications include, by way of example, carpet backings and reinforced sheet materials for general engineering applications.

In the production of tufted carpets, it is customary to utilise a primary backing into which tufts are inserted to form the pile of the carpet. A secondary carpet backing very often in the form of a foamed or woven material is then applied to the rear face of the tufted primary backing in order to cover the tufts in position within the primate backing. A variety of materials can be used for the primary backing but it is common to form the primary backing of woven polypropylene tapes. Polypropylene is utilised because it is cost-effective. If desired the polypropylene tape can be fibrillated in order to permit easy needle penetration and at the same time provide high residual strength in the finished carpet.

Although the use of woven polypropylene tape as a carpet backing has proved highly successful, it has certain disadvantages in that the fabric formed by the woven polypropylene as the primary backing results in a product which has limited dimensional stability and, if the carpet or carpet tile is cut, then frayed edges result.

It has previously been proposed to provide carpet backings incorporating polypropylene which seek to overcome such disadvantages. For example, U.S. Pat. No. 3,533,893 (Hartstein) discloses a primary carpet backing having a laminate made up of a continuous film of a high melting point polymer and a continuous film of a lower melting point polymer. Tufts of a textile material are passed through the laminate after formation thereof to form a tufted-pile fabric. The film of lower melting point polymer is specifically disclosed as being polyethylene or ethylene vinyl acetate. The laminate disclosed in U.S. Pat. No. 3,533,893 has disadvantages in that it is relatively dimensionally rigid and has a tendency to deflect tufting needles due to imperfections in the films which make up the laminate.

In order to reduce the dimensional rigidity of such fabrics, it has also been proposed to produce carpet backings of woven tapes e.g. of polypropylene. Such woven fabrics also have the above-stated disadvantages that they are less dimensionally stable than is desirable and, if cut, the edges tend to fray. In order to obviate these disadvantages it is proposed in, for example, British Patent No. 1,420,517 (Du Pont) and U.S. Pat. No. 3,627,605 (Burlington) to form woven fabrics of tapes consisting of a layer of high melting point polymer, e.g. polypropylene bonded to a layer of polyethylene of lower melting point. The woven fabric is then heated at a temperature around the melting point of the polyethylene to soften it and cause fusion of the interwoven tapes.

Although composite tapes of polypropylene and polyethylene are useful to an extent, polyethylene has disadvantages in that it does not easily bond with polypropylene and in many cases has to be secured thereto by means of an adhesive or primer. It is thought that because of the difficulty in bonding polyethylene to polypropylene, surface layers of polyethylene do not provide adequate protection during a drawing operation to effect molecular orientation of the polypropylene in order to increase its strength. As a result such polyethylene-coated polypropylene tapes can suffer from unacceptable breakage of the tape during drawing operations particularly at high draw ratios.

One of the objects of the present invention is to provide a means of producing composite elongated elements such as tape which can be used to produce a fabric suitable for a variety of uses and in which elements the disadvantages which can arise with composite tapes incorporating polyethylene as a surface layer are obviated or mitigated.

According to the present invention there is provided a thermoplastic composite material comprising at lease one mat of mutually intersecting elongate elements fusible together at least at their intersections, each of said elements comprising a molecularly-oriented thermoplastic polymer base having at least one thermoplastic surface polymeric layer compatibly bonded to said polymer base by molecular interspersion between the contiguous surfaces of the adjoining base and surface layers, and said surface polymeric layer having a softening temperature lower than that of the polymer base.

According to a further aspect of the present invention there is provided an elongated thermoplastic composite material comprising a molecularly-oriented thermoplastic polymer-base having at least one thermoplastic-surface polymeric layer compatibly bonded to said polymer base by molecular interspersion between the contiguous surfaces of the adjoining base and surface layers, and said surface polymeric layer having a softening temperature lower than that of the polymer base.

By "molecular interspersion" is meant the intimate molecular comparability of molecules of the surface layer and the adjacent polymer base and vice versa so that there is intermingling or fusion at their contiguous boundaries. It is believed that such molecular interspersion effectively forms an amorphous sheath which protects the polymer base against fracture during drawing thus providing mutual mechanical reinforcement.

Mutual mechanical reinforcement involves the surface material being capable of high elongation when drawn the solid state (or even being drawn at a temperature above its softening point, i.e. in the molten state). With a polymer layer of high modulus, crystalline or oriented material sandwiched between amorphous high elongation surface layers, propagation of transverse fractures is inhibited allowing the total composite to be highly drawn.

Preferably, the oriented thermoplastic polymer base a polyolefin polymer such as polypropylene, a polyester such as polyethyleneterephthalate, a polyamide such as Nylon 6 or 6.6, or a polyethylene having a density range 0.940 to 0.970 or linear low density polyethylene.

Preferably also, when the polymer base is polypropylene each surface layer is an ethylene-propylene co-polymer, a polybutylene such as polybutene-1, or a co-polymer comprising two or more of butylene, ethylene and propylene. When the polymer base is a polyester, the surface layers can be a co-polyester and when the polymer base is a polyamide can be a co-polyamide.

Preferably also, each mat of intersecting elongate elements is formed by weaving, knitting or by laying down of a random fibrous web.

According to a further aspect of the present invention there is provided a method of producing a thermoplastic composite material comprising providing a plurality of elongate elements each comprising a molecularly oriented thermoplastic polymer base having at least one thermoplastic surface polymeric layer compatibly bonded thereto by molecular interspersion between contiguous surfaces of the adjoining base and surface layers, and said surface layer having a softening temperature lower than that of the polymer base; forming a mat of mutually intersecting elongate elements; heating said mat at a temperature at or above the softening temperature of each surface polymeric layer but below the softening temperature of the polymer base; and cooling the mat causing the elongate elements to fuse together at least at their intersections.

Preferably, heating of the mat is effected within or in relation to a mould or former whereby, on cooling, the mat assumes a predetermined three-dimensional form.

Preferably also, the method comprises, prior to fusion, forming a stack of two or more superimposed mats of intersecting elongate elements; and heating the stack to form a multilayered sheet. The axes of orientation of the elongate elements may be angularly displaced relative to the elements in the adjacent mat so as to provide a cross-laid, balanced structure.

Embodiments of the present invention will now be described by way of example:

EXAMPLE 1

A fabric suitable for use as the primary backing of a tufted carpet is formed from a film of mono-axially oriented polyolefin polymer such as polypropylene. The film is formed by extrusion and stretched along a single axis. The polypropylene film has a softening range of around 165° C. The preformed polypropylene film is then coated on both sides thereof with a surface layer of a polymeric material such as an ethylene-propylene co-polymer which has a softening range lower than that of the polypropylene core, for example of the order of 100° C.–110° C. On the application of heat at a temperature sufficient to soften the surface layers but not the polypropylene, molecular interspersion takes place at the contiguous boundaries between the polypropylene and its surface layers which serves to protect the polypropylene against breakage during subsequent drawing operations.

After cooling, the composite film is then slit to form a plurality of separate elongate elements in the form of tapes, each tape consisting of a central polypropylene base or core having bonded thereto on each face thereof a surface layer of the ethylene-propylene co-polymer having a lower softening temperature than that of the polypropylene. The tape thus formed is then drawn at a draw ratio of the order of 20:1 in order to effect molecular orientation of the polypropylene and consequently increase correspondingly the strength of the polypropylene component of the tape and therefore the tape itself. During drawing, the molten co-polymer surface layers permit this degree of consistent drawing to an extent which is greater than that which would be permitted if, for example, polyethylene was used as a surface layer. The tape is then woven in known manner to form a fabric or mat suitable for use as a primary backing of a tufted carpet. The warp and weft tapes may be fibrillated to ease needle penetration.

Once the primary backing has been woven, the backing is passed to a tufting machine for insertion of the carpet tufts, again in accordance with known practice. The tufted primary backing is then passed to a heating station where heat is applied at a temperature sufficient to soften the co-polymer surface layers of the primary backing so that, at the intersections of the warp and weft tapes,-the tapes become fused together. The selected temperature is less than 165° C. so that it is below the softening temperature of the polypropylene core in order that little loss of orientation or strength occurs in the core. After cooling, the woven tapes of the primary backing are integrated by fusion. The sheet thus formed provides a primary backing with excellent dimensional strength and stability and is also one which does not fray at the edges if cut. Fusing of the adjacent tapes together also tends to lock the individual tufts of the carpet into the primary backing in a manner which is more secure than with previously proposed arrangements. In addition, it has been found that a primary backing produced in accordance with the present invention can have a tensile strength considerably in excess of that of previously proposed carpet backings in which polyethylene is used as the surface layer.

In the embodiment described above, the surface polymeric layers can be an amorphous layer constituted preferably by an ethylene-propylene co-polymer but other polymers such as polybutene-1, or a co-polymer of two or more polymers selected from butylene, ethylene and propylene can also De employed.

In the above-described embodiment, the primary backing is described as being formed with a surface polymeric layer on both faces of the polypropylene film. It would, of course, be possible to provide a surface layer only on one side of the polypropylene film. Also, the polypropylene film can be oriented hi-axially rather than mono-axially.

Also, instead of the surface layer or layers being subsequently applied to a preformed polypropylene film, the composite film can be produced by co-extrusion of separate melt streams which are brought together and cooled to form a core layer of polypropylene to which is bonded on one or both sides a surface polymeric layer having a lower softening point than the polypropylene.

Furthermore, the polymer of the surface layer can be formulated to have dye acceptance with acid dye formulations thereby dispensing with the necessity of needling dye-receptive fibre into a surface of a woven polypropylene primary backing as it presently carried out in order to prevent "grinning" in the finished carpet.

EXAMPLE 2

In a second embodiment of the present invention, the composite tapes are formed as in Example 1 described above and woven in the usual way to form a woven primary backing fabric or mat. At the heat fusion stage, however, the tufted primary carpet backing is heated whilst constrained in a shaped mould or former. The applied heat then softens the thermoplastic outer layers and the product is then allowed to cool thereby producing a carpet having a three-dimensional form dictated by the shade of the mould or former. Such a carpet product is useful in carpets for use, for example, in the interiors of automobiles where a carpet may have to conform. To the well of the vehicle floor.

EXAMPLE 3

This Example relates to the manufacture of a self-reinforcing thermoplastic composite material suitable for general engineering applications.

In this Example, the material is produced from a tape having a polypropylene (PP) core provided one both sides with a surface layer or cap coat of a random co-polymer of ethylene-propylene (EP). The polypropylene core is a polypropylene homo-polymer of 3.5 melt flow index (MFI). The EP/PP/EP tape structure has relative cross-sectional thicknesses of 7/86/7 where such thicknesses are expressed as a percentage of the total cross-sectional thickness of the tape.

The polymers are cast as a film on to chill rolls, slit and drawn in a hot air oven at a draw ratio of 10:1 prior to annealing and winding on to packages suitable for weaving. The tapes thus produced are 220 tex, 3 mm wide with a breaking force of 530 Newtons (N) and extension at failure of 14%. The surface layers are compatibly bonded to the polypropylene core by molecular interspersion between the contiguous surfaces of the layers and core.

The tapes were used as both the warp and weft to produce a plain woven fabric having a tape count of 59 tapes per 10 cm width in the warp direction and 47 tapes per 10 cm width in the weft direction.

A plurality of layers or mats of this woven material were superimposed on each other and formed under heat and pressure in a single daylight press (10 Bar at 165° C.) to produce a self-reinforcing laminate on cooling. It will be readily apparent that any suitable number of layers can be incorporated depending on the desired strength and application of the fabric. For example, 20 layers give an areal density of 4.7 kg/m$^2$.

The tapes can have a mono-axial or biaxial orientation and when the mats are superimposed upon each other, so axes of orientation of the woven tapes in each adjacent mat can be angularly displaced relative to each other so as to provide a cross-laid balanced structure having high impact strength.

EXAMPLE 4

A self-reinforcing thermoplastic composite fabric is produced as described above in Example 3 with the difference that the tapes during the extrusion process, are drawn at a draw ratio of 20:1 for the same film constituents. The increased draw ratio gives the 220 tex 3 mm wide tape an improved breaking load of 600N and reduced extension at failure of 10%.

EXAMPLE 5

A self-reinforcing thermoplastic composite fabric is produced as described in foregoing Example 4 with the difference that the surface layers or cap coats of the tape are of a random co-polymer of ethylene/butylene instead of a co-polymer of ethylene/propylene.

Physical properties of the fabrics as produced in accordance with Examples 3, 4 and 5 are set out in the following table:

| PROPERTIES OF SELF REINFORCING POLYPROPYLENE COMPOSITES MADE FROM FABRICS OF EXAMPLES 3–5 | | | |
| --- | --- | --- | --- |
| (Testing at Room Temperature (20° C.) unless otherwise stated) | Example 3 Tape Draw Ratio - 10:1 | Example 4 Tape Draw Ratio - 20:1 | Example 5 Tape Draw Ratio - 20:1 |
| Mean Tensile Modulus of Elasticity (GPa) | 1.14 | 2.49 | 2.41 |
| Composite formation temperature in the range of (°C.) | 160 | 150–165 | 150–165 |
| Optimum Temperature of formation (°C.) | — | 150 | 160 |
| Tensile modulus of elasticity at optimum temperature of formation (GPa) | — | 2.54 | 2.45 |
| Mean Ultimate Tensile Stress (MPa) | 155 | 200.6 | 170.3 |
| Mean Ultimate Tensile Stress at optimum formation temp (MPa) | — | 204.1 | 176.8 |
| Flexural Modulus of Elasticity | | | |
| Range of formation temps (°C.) | 160 | 145–165 | 150–165 |
| Mean Elastic Mod. (GPa) | 2.0 | 5.6 | 5.6 |
| Optimum temp for manufacture (°C.) | — | 150 | 155 |
| Elastic Mod. at optimum temp (GPa) | — | 5.8 | 5.8 |
| Compressive Modulus of elasticity | | | |
| (Force applied in the same plane as the laminate direction.) | | | |
| Elastic modulus (MPa) | 531 | 728 | 875 |
| Ultimate Compressive Stress (MPa) | 43 | 33.5 | 27.6 |
| Compressive modulus of elasticity | | | |
| (Force applied normally to laminate plane.) | | | |
| Elastic modulus (MPa) | — | 1203 | 1271 |
| Ultimate compressive stress (MPa) | — | 11.12 | 5.05 |
| Buckling tests | | | |
| Mean energy absorbed for 7% reduction length (J) | — | 11.12 | 5.05 |
| Buckling stress (MPa) | — | 25.9 | 22.1 |
| Charpy energy absorbed (ft-lbs): | | | |
| 20° C. | 8.5 | 7.0 | 4.9 |
| 80° C. | 5.5 | 7.1 | 4.0 |

EXAMPLE 6

This Example relates to the manufacture of an impact resistant sheet suitable for antiballistic protection.

In this Example, tapes are co-extruded having a structure in which a polypropylene core has surface or cap layers on either side thereof of a random co-polymer of ethylene-propylene. The polypropylene is a homo-polymer having a melt flow index MFI) of 3 and the EP/PP/EP tape structure has relative cross-sectional thicknesses of 7/86/7 where such thicknesses are expressed as a percentage of the total cross-sectional thickness of the tape.

The molten polymers are cast on to a chill roll to produce a composite film in which the surface layers are compatibly bonded to the polypropylene core by molecular interspersion between the contiguous surfaces of the layers and core. The composite film emanating therefrom is then slit and drawn in a hot air oven at a draw ratio of 20:1 before being annealed and wound up on to a package as a 220 tex tape of width 3 mm with a breaking force of 600 Newtons (N) and extension at break of 10%.

These tapes are used for both the warp and wet of a woven plain weave fabric having 59 tapes per 10 cm width in the warp direction and 47 tapes per 10 cm width in the weft direction. The same tapes can also be woven to give a twill weave fabric having 40 tapes per 10 cm width in both warp and weft directions.

A plurality of layers or mats of the fabrics thus formed are superimposed on each other, crosslaid if desired as described in Example 3, and formed under heat and pressure to produce, on cooling, a rigid, self-reinforcing, thermoplastic laminated composite material. With a single daylight press, a composite material having an areal density of 10 kg/m$^2$ can be formed using a pressure of 10 Bar at a temperature of 165° C. and dwell time of 20 minutes. The number of layers used form the composite material can be varied in accordance with requirements but in the present Example materials incorporating 43 layers or mats of plain weave or 57 layers or mats of twill weave have been employed.

Panels made from twill weave and plain weave tapes as described above were subjected to attack from a 9 mm weapon using full service charge to propel a ball at normal impact from 15 meters range. Strike or impact velocities were in the range of 422–429 meters/second. A standard impact velocity was measured in the tests, being the impact speed at which 50% of the ballistic missiles were stopped by the panel whilst the remaining 50% were passed through. A standard impact velocity ($V_{50}$) of 421 meters/second was achieved with a panel utilising a weave areal density of 10.68 kg/m$^2$ and with a panel utilising a flat or plain weave areal density of 11.76 kg/m$^2$. Both the plain and twill weave panels in defeating such an attack show a better result than a standard panel of glass reinforced plastic (GRP) which would require an areal density of 14 kg/m$^2$ to obtain the same level of protection.

Above Examples 3 to 6 give specific relative percentage thicknesses for the surface layers and core. These relative thicknesses are not thought to be critical but it has been found that a surface layer having a thickness of 3% to 20% of the overall thickness of the tape is satisfactory.

The multilayered composite sheet material as described above in Examples 3 to 6 can be used for a variety of other applications where strength is of importance e.g. for protective applications such as toe-caps for protective footwear, connecting straps for the handles of intermediate bulk containers or the containers themselves, tarpaulins, packaging and general fabrication.

The above-described embodiments describe a composite material in which the constituent elongate elements such as tapes are intersected by weaving. It will be readily apparent that the mats or layers of elongate elements can be caused to intersect with each other by other processes e.g. by knitting or by the random laying down of fibrous webs.

Furthermore, the mat or mats of fabrics formed in accordance with the present invention can be moulded into a variety of shapes. For example, the fabric can De formed into a tube or pipe by spirally winding the fabrics or tapes about a cylindrical mandrel.

We claim:

1. A thermoplastic composite material comprising at least one mat of mutually intersecting tapes fused together at least at their intersections, each of said tapes comprising a molecularly-oriented thermoplastic polymer base having two sides, at least one of which is coated with a thermoplastic surface polymeric layer having a softening temperature lower than that of the polymer base and being bonded to said polymer base by molecular interspersion between the contiguous surfaces of the adjoining base and surface layers, wherein each of said tapes is subjected to elongation at a draw ratio of about 20:1.

2. A material as claimed in claim 1, in which the oriented thermoplastic polymer base is a polyolefin polymer.

3. A material as claimed in claim 2, in which the oriented polymer base is polypropylene, a polyester, a polyamide, or a polyethylene or low linear polyethylene.

4. A material as claimed in claim 3, in which the oriented polymer base is a polyester and is polyethyleneterephthalate.

5. A material as claimed in claim 3, in which the oriented polymer base is a polyamide and is Nylon 6 or 6.6.

6. A material as claimed in claim 4, in which the oriented polymer base is polyethylene having a density in the range 0.940 to 0.970 or low linear polyethylene.

7. A material as claimed in claim 1, in which the molecular orientation of the polymer base is mono-axial or bi-axial.

8. A material as claimed in claim 1, in which the polymer base is polypropylene and the surface polymeric layer or layers is constituted by a polybutylene or a co-polymer of two or more polymers of butylene, ethylene and propylene.

9. An elongated thermoplastic composite material as claimed in claim 8, in which the surface polymeric layer or layers is of an ethylene-polypropylene co-polymer and wherein said composite a material has an elongation within the range 10:1 to 20:1.

10. A material as claimed 8, in which the surface polymeric layer or layers is polybutene-1.

11. An elongated thermoplastic composite material as claimed in claim 1, in which the polymer base is a polyester and the surface polymeric layer or layers is a co-polyester and wherein said composite material has an elongation within the range 10:1 to 20:1.

12. An elongated thermoplastic composite material as claimed in claim 1, in which the polymer base is a polyamide and the surface polymeric layer or layers is a co-polyamide and wherein said composite material has an elongation within the range 10:1 to 20:1.

13. A material as claimed in claim 1, in which each surface layer has a thickness of 3% to 20% of the total thickness of the material.

14. A material as claimed in claim 1, in which pile-forming tufts are inserted into the mat to form a carpet, the tufts being locked into the mat on fusion of the surface layer or layers.

15. A material as claimed in claim 1, in which a plurality of mats are superimposed on each other to form a layered structure in which each mat is secured to an adjacent mat by fusion of said surface polymeric layers.

16. A material as claimed in claim 15, in which the direction of molecular orientation of the polymer base of each mat is angularly offset relative to that of an adjacent mat or mats so as to increase the strength of the composite material.

17. A material as claimed in claim 15, in which the plurality of mats is fused together under heat and pressure to form a protective laminate.

18. A material as claimed in claim 17, in which the protective laminate is a rigid antiballistic protective laminate.

19. A material as claimed in claim 1, in which the material is moulded into a three-dimensional configuration.

20. A material as claimed in claim 19, in which the material is spirally wound to form a tube or pipe.

21. A material as claimed in claim 1, in which each mat of intersecting elongate elements is formed by weaving, knitting, or random laying of said elements to form a web.

22. A material as claimed in claim 1, in which the elongated elements are in the form of tapes.

23. A thermoplastic composite material comprising at least one mat of mutually intersecting tapes fused together at least at their intersections, each of said tapes comprising a molecularly-oriented thermoplastic polymer base having two sides, each of which is coated with a thermoplastic surface polymeric layer having a softening temperature lower than that of the polymer base and bonded to the polymer base by molecular interspersion between the contiguous surfaces of said base and its adjoining surface layers, wherein each of said tapes has been subjected to elongation at a draw ratio of about 20:1.

24. A thermoplastic composite material as in claim 23, wherein the polymer base is comprised of a homopolymer or a co-polymer in which the monomer(s) of the polymer base is also a monomer of the co-polymer of the surface polymeric layer.

25. A tape comprising a molecularly-oriented thermoplastic polymer base having two sides, each of which is coated with a thermoplastic surface polymeric layer, each of said surface polymeric layers having a softening temperature lower than that of the polymeric base and being bonded to the polymer base by molecular interspersion between contiguous surfaces of said polymeric base and said surface layers, wherein said tape has been subjected to elongation at a draw ratio of about 20:1.

26. A tape comprising a molecularly-oriented thermoplastic polymer base having two sides at least one of which is coated with a thermoplastic surface polymeric layer, said surface polymeric layer(s) having a softening temperature lower than that of the polymeric base and being bonded to said polymer base by molecular interspersion between the contiguous surfaces of the adjoining base and surface layers, wherein said tape is subjected to elongation at a draw ratio of about 20:1.

27. A method of producing a thermoplastic composite material comprising:

providing a coated sheet material comprising a thermoplastic polymer base coated with at least one thermoplastic surface polymeric layer, said surface layer(s) having a softening temperature lower than that of the polymer base;

heating said coated sheet material to effect molecular interspersion between the contiguous surfaces of the adjoining base and surface layer(s);

forming said coated sheet material into tapes by slitting;

subjecting said tapes to a draw ratio of about 20:1;

forming a mat of mutually-intersecting elongate tapes;

heating said mat at a temperature at or above the softening temperature of each surface polymeric layer but below the softening temperature of the polymer base; and cooling the mat to cause the elongate tapes to fuse together at least at their intersections.

28. A method as claimed in claim 27, comprising superimposing a plurality of mats on each other to form a layered structure, and securing each mat to an adjacent mat by fusion of said surface polymeric layer or layers.

29. A method as claimed in claim 28, in which fusion of the plurality of mats is effected by the application of heat to soften each surface polymeric layer, and applying pressure thereto.

30. A method as claimed in claim 29, comprising the heat and pressure whilst the material is located in a mould or on a former and subsequently cooling the material to set the material in moulded form.

31. A method as claimed in claim 30, comprising spirally winding the material into the form of a tube or pipe.

32. A method as claimed in claim 27, comprising inserting a plurality of tufts through a mat to form a pile carpet, and heating the tufted mat to soften the surface layer or layers, and cooling the tufted mat to lock the tufts.

* * * * *